(12) United States Patent
Kim et al.

(10) Patent No.: US 9,048,486 B2
(45) Date of Patent: Jun. 2, 2015

(54) NEGATIVE ACTIVE MATERIAL, METHOD OF PREPARING THE NEGATIVE ACTIVE MATERIAL, ELECTRODE INCLUDING THE NEGATIVE ACTIVE MATERIAL, AND LITHIUM BATTERY INCLUDING THE ELECTRODE

(75) Inventors: Deok-Hyun Kim, Yongin-si (KR); Jae-Myung Kim, Yongin-si (KR); Kyu-Nam Joo, Yongin-si (KR); Tae-Sik Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 190 days.

(21) Appl. No.: 13/431,610

(22) Filed: Mar. 27, 2012

(65) Prior Publication Data
US 2013/0115517 A1 May 9, 2013

(30) Foreign Application Priority Data

Nov. 8, 2011 (KR) .......................... 10-2011-0115915

(51) Int. Cl.
*H01M 4/133* (2010.01)
*H01M 4/134* (2010.01)
*H01M 4/1395* (2010.01)
(Continued)

(52) U.S. Cl.
CPC ............ *H01M 4/134* (2013.01); *H01M 4/1395* (2013.01); *H01M 4/386* (2013.01); *Y02E 60/122* (2013.01); *H01M 4/364* (2013.01); *H01M 4/366* (2013.01); *H01M 4/48* (2013.01); *H01M 4/483* (2013.01); *H01M 4/625* (2013.01)

(58) Field of Classification Search
CPC ............ H01M 4/1393; H01M 4/1391; H01M 4/1395; H01M 4/134
USPC .................................... 429/231.8, 212, 218.1
See application file for complete search history.

(56) References Cited

U.S. PATENT DOCUMENTS 5,456,986 A    10/1995   Majetich et al.
5,698,340 A * 12/1997   Xue et al. ................... 429/231.4
(Continued)

FOREIGN PATENT DOCUMENTS

EP          2372816 A1    10/2011
JP        2003-308837    10/2003
(Continued)

OTHER PUBLICATIONS

Tomokazu et al—Nano Si Cluster-SiOx-C Composite Material as High-Capacity Anode Material for Rechargeable Lithium Batteries Journal of the Electrochemical Society, 153 (2) A425-A430 (2006).*
(Continued)

*Primary Examiner* — Stewart Fraser
*Assistant Examiner* — Olatunji Godo
(74) *Attorney, Agent, or Firm* — Knobbe Martens Olson & Bear LLP (57) ABSTRACT

A negative active material including: a composite including a matrix comprising silicon oxide, silicon carbide, and carbon and silicon particles dispersed in the matrix; and a carbon coating film formed on a surface of the composite, wherein an intensity ratio of a SiC peak to a Si peak in an X-ray diffraction spectrum is 1 or more, a method of preparing the negative active material, a negative electrode including the negative active material, and a lithium battery including the electrode.

19 Claims, 10 Drawing Sheets

(51) Int. Cl.
*H01M 4/38* (2006.01)
*H01M 4/36* (2006.01)
*H01M 4/48* (2010.01)
*H01M 4/62* (2006.01)

(56) References Cited

U.S. PATENT DOCUMENTS

| | | | |
|---|---|---|---|
| 5,716,422 A * | 2/1998 | Muffoletto et al. | 29/623.5 |
| 7,037,581 B2 * | 5/2006 | Aramata et al. | 428/402 |
| 7,831,731 B2 | 11/2010 | Tang et al. | |
| 2002/0164479 A1 * | 11/2002 | Matsubara et al. | 428/367 |
| 2003/0215711 A1 | 11/2003 | Aramata et al. | |
| 2005/0214644 A1 | 9/2005 | Aramata et al. | |
| 2006/0068287 A1 | 3/2006 | Morita et al. | |
| 2008/0193831 A1 | 8/2008 | Mah et al. | |
| 2009/0004564 A1 * | 1/2009 | Ishida et al. | 429/219 |
| 2009/0029256 A1 * | 1/2009 | Mah et al. | 429/231.8 |
| 2009/0269669 A1 * | 10/2009 | Kim et al. | 429/231.8 |
| 2009/0311606 A1 | 12/2009 | Fukuoka et al. | |

FOREIGN PATENT DOCUMENTS

| | | |
|---|---|---|
| JP | 3952180 B2 | 5/2007 |
| JP | 2008-198610 A | 8/2008 |
| KR | 1996-7003487 A | 8/1996 |
| KR | 1020040058635 A | 7/2004 |
| KR | 10-2006-0051615 A | 5/2006 |

OTHER PUBLICATIONS

Wang et al—Characterization of Nanocrystalline Si-MCMB Composite Anode Materials (Electrochemical and Solid Letters, 7 (8) A250-A253 (2004)).*
Uday et al.—Nano- and bulk-silicon-based insertion anodes for lithium-ion secondary cells Journal of Power Sources 163 (2007) 1003-1039.*
Datta et al. (Journal of Power Sources 158 (2006) 557-563).*
Shimoo et al. (Journal of Materials Science 38 (2003) 4973-4979).*
Jones et al. (eds.), Silicon-Containing Polymers, 697-726. (2000 Kluwer Academic Publishers).*
Extended European Search Report issued by the European Patent Office dated Dec. 20, 2012, 6 pages.

* cited by examiner

NEGATIVE ACTIVE MATERIAL, METHOD OF PREPARING THE NEGATIVE ACTIVE MATERIAL, ELECTRODE INCLUDING THE NEGATIVE ACTIVE MATERIAL, AND LITHIUM BATTERY INCLUDING THE ELECTRODE

CROSS-REFERENCE TO RELATED APPLICATIONS

This application claims the benefit of Korean Patent Application No. 10-2011-0115915, filed on Nov. 8, 2011, in the Korean Intellectual Property Office, the disclosure of which is incorporated herein in its entirety by reference.

BACKGROUND

1. Field

One or more embodiments relate to a negative active material, a method of preparing the negative active material, an electrode including the negative active material, and a lithium battery.

2. Description of the Related Technology

The development of portable electronic devices, communication devices, or the like has led to an increase in demand for lithium batteries with high energy-density.

As a negative active material for lithium batteries, a metallic oxide, such as vanadium, silicon, bismuth, zirconium, or the like is used.

If silicon oxide is used as a negative active material, a formed electrode has high capacity. However, lifetime characteristics and conductivity characteristics of the electrode may not be satisfactory.

Therefore, method of forming a carbon coating layer on the surface of silicon oxide has been attempted. However, a negative active materials that are formed by using these method have unsatisfactory conductivity and lifetime characteristics.

SUMMARY

One or more embodiments include a negative active material having excellent capacity and lifetime characteristics.

One or more embodiments include a method of preparing the negative active material.

One or more embodiments include a negative electrode including the negative active material.

One or more embodiments include a lithium battery including the negative electrode.

Additional aspects will be set forth in part in the description which follows and, in part, will be apparent from the description, or may be learned by practice of the presented embodiments.

According to one or more embodiments, a negative active material includes a composite including a matrix comprising silicon oxide, silicon carbide, and carbon and silicon particles dispersed in the matrix; and a carbon coating film formed on a surface of the composite, wherein the intensity ratio of a SiC peak to a Si peak in an X-ray diffraction spectrum is 1 or more According to one or more embodiments, a method of preparing a negative active material including a composite comprising a matrix comprising silicon oxide, silicon carbide, and carbon and silicon particles dispersed in the matrix; and a carbon coating film formed on a surface of the composite, wherein the intensity ratio of a SiC peak to a Si peak in an X-ray diffraction spectrum is 1 or more, the method comprising:

supplying silicon particles and silicon oxide to a carbon rod to prepare a negative electrode for arc discharging; and
arc discharging the negative electrode and a positive electrode for arc discharging.

According to one or more embodiments, provided is a negative electrode that includes the negative active material.

According to one or more embodiments, provided is a lithium battery that includes a negative electrode comprising the negative active material.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

Hereinafter, embodiments of a negative active material, a method of preparing the negative active material, and an electrode including the negative active material, and a lithium battery including the electrode will be described in detail.

A negative active material according to an embodiment includes a composite and a carbon coating film formed on the surface of the composite, wherein the composite includes a matrix including silicon oxide, silicon carbide, and carbon and silicon particles dispersed in the matrix.

Figure 1:
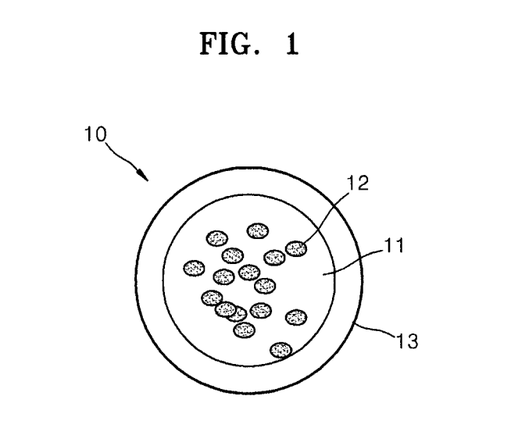
FIG. 1 is a schematic view of a negative active material according to an embodiment.

FIG. 1 is a schematic view of a negative active material 10 according to an embodiment, and referring to FIG. 1, a negative active material according to an embodiment will now be described in detail.

The negative active material 10 may include: a composite including a matrix 11, for example, $SiO_xC_y$ (wherein x is from 0.1 to 1.2 and y is from 0.01 to 0.2), including silicon carbide, silicon oxide, and carbon; silicon particles 12 dispersed in the matrix 11; and a carbon coating film 13 formed on the surface of the matrix 11 of the composite.

In the composite of the negative active material, the silicon particles 12 are uniformly disposed in the matrix 11 that includes silicon carbide, silicon oxide and carbon. An example of the matrix 11 is a $SiO_xC_y$ (x is from 0.1 to 1.2 and y is from 0.01 to 0.2) matrix. When using the structure described above, destruction of particles due to a large volumetric change occurring when lithium is absorbed and desorbed in a great quality during charging and discharging, and interruption of a flow of lithium ions in an electrode due to a volumetric expansion of silicon and silicon oxide which have relatively low conductivity occurring when lithium is absorbed, may be prevented. Also, the presence of SiC can help the initial irreversible capacity of the negative active material caused by lithium oxide ($Li_2O$) to be reduced and conductivity of the negative active material to be improved.

Also, the formation of the carbon coating film on the surface of the composite may contribute to conductivity.

The silicon particles of the negative active material may greatly expand or shrink when lithium is absorbed and desorbed. To reduce stress due to this volumetric change, the silicon particles are uniformly dispersed in the matrix including silicon carbide, silicon oxide, and carbon.

An amount of the silicon carbide included in the matrix may be from about 50 to about 90 parts by weight based on 100 parts by weight of the silicon particles.

The silicon carbide may be amorphous or crystalline, and the silicon carbide may form a matrix together with silicon oxide and carbon and may uniformly disperse silicon active particles in such a manner that the matrix surrounds or accommodates the silicon particles.

If the amount of the silicon carbide is within the range described above, a formed negative active material may have excellent conductivity.

An amount of the silicon oxide may be from about 10 to about 30 parts by weight based on 100 parts by weight of the silicon particles.

If the amount of the silicon oxide is within this range, a formed negative active material may have excellent capacity characteristics without a decrease in conductivity and lifetime.

The total amount of the carbon in the composite may be from about 0.5 to about 50 parts by weight based on 100 parts by weight of the silicon particles. If the amount of the carbon is within this range, a formed negative active material may have excellent capacity without a decrease in conductivity.

An average particle size of the silicon particles may be from about 1 to about 300 nm, and for example, from about 2 to about 50 nm.

If the average particle size of the silicon particles is within this range, a battery having excellent cycle efficiency may be obtained without a decrease in charge and discharge capacity of the negative active material including the silicon particles.

The average particle size of the silicon particles may be measured by X-ray diffraction analysis (XRD).

The crystal granule size of Si may be measured by using a full width at half maximum (FWHM) of a Si main peak and a Scherrer's formula as given below.

$$T = \frac{K\lambda}{\beta\cos\theta} \quad \text{Equation 1}$$

The silicon oxide in the composite may be amorphous or crystalline. For example, the silicon oxide may be combined with silicon together with the silicon carbide and may uniformly disperse in the matrix in such a manner that the silicon oxide surrounds or accommodates the silicon.

The carbon in the composite may include at least one selected from the group consisting of graphite, hard carbon, soft carbon, amorphous carbon, and acetylene black. For example, the carbon may be carbon black.

The amount of carbon in the carbon coating film may be from about 0.1 to about 20 parts by weight, for example, about 1 to about 5 parts by weight, based on 100 parts by weight of the composite. If the amount of the carbon in the carbon coating film is within these ranges, a prepared negative active material may have excellent conductivity without a decrease in cycle characteristics and a charge and discharge capacity.

The structure of the negative active material in which silicon particles are dispersed in the matrix including SiC may be confirmed using peaks of an X-ray diffraction spectrum.

For example, the negative active material may have a SiC peak at a Bragg 2θ angle of about 34° to about 37°, for example, about 35.5° to about 36.5° in an X-ray diffraction spectrum.

The SiC peak may have a FWHM of about 0.1 to about 1, for example, about 0.3 to about 0.5. If the FWHM of the SiC peak is within this range, it can be confirmed that SiC is crystalline and has good capacity and conductivity.

In the X-ray diffraction spectrum, a peak corresponding to a Si(111)plane may be present at a Bragg 2θ angle of about 27° to about 29°, for example, about 27.5° to about 28.5°.

The intensity ratio of the SiC peak with respect to a Si peak may be 1 or more, for example, about 1 to about 10, or, about 1.8 to about 5.5, in the X-ray diffraction spectrum of the negative active material.

If the intensity ratio of the SiC peak with respect to the Si peak is within these ranges, a formed negative active material may have excellent capacity characteristics.

The negative active material may provide a discharge capacity per unit weight of about 2270 mAh/g or more and a discharge capacity per unit volume of 1130 mAh/cc or more. Also, the electric conductivity of the negative active material may be about 50 S/m or less, for example, from about 20 to about 40 S/m. The electric conductivity may be measured by filling a cylindrical holder having a diameter of 2 cm with the negative active material and measuring a resistance thereof by using a 4-probe device while a pressure of about 4 kN to about 20 kN is applied thereto.

From peak intensities of the respective elements of the negative active material in an X-ray fluorescence analysis spectrum, a total amount of silicon, oxygen, and carbon may be measured.

The amounts of silicon, oxygen, and carbon may be measured based on results of analyzing the negative active material obtained by using an X-ray fluorescence analyzer.

An electrode and a lithium battery using the negative active material may have excellent capacity and lifetime characteristics and improved initial efficiency.

Hereinafter, a method of preparing the negative active material, according to an embodiment, will be described in detail.

The pressure of a chamber is increased to $2\times10^{-1}$ torr by filling the chamber with He or Ar.

About 300 A of current and about 40 V of voltage are applied to an electrode to cause an arc discharge between a negative electrode and a positive electrode to synthesize a powder.

Figure 2A:
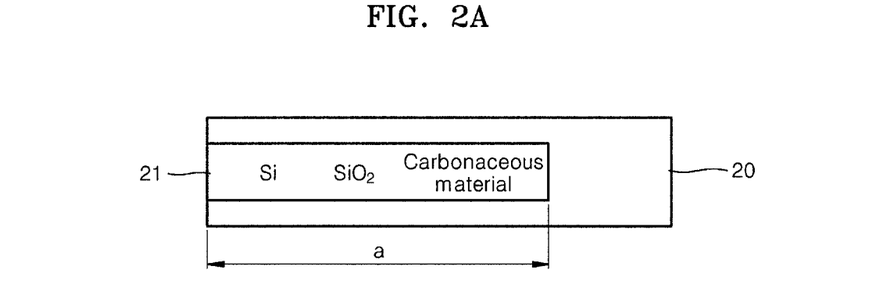
FIG. 2A is a side-sectional view of a carbon rod according to an embodiment.

As illustrated in FIG. 2A, a sample inlet portion 21 is formed in a carbon rod 20 for arc discharging, and then silicon particles and silicon oxide are supplied to the sample inlet portion 21, thereby completing preparation of a negative electrode for arc discharging.

The supplying method of silicon particles and silicon oxide to the sample inlet portion 24 is not limited. For example, silicon oxide and silicon particles may be sequentially supplied to a sample inlet portion of a carbon rod. Alternatively, silicon oxide and silicon particles may be mixed and then the mixture supplied.

According to an embodiment, a carbonaceous material may be further supplied to the carbon rod 20 of the sample inlet portion 21 before silicon particles and silicon oxide are supplied thereto. In the case in which the carbonaceous material is supplied to the sample inlet portion 24, as illustrated in FIG. 2A, the carbonaceous material is first supplied to the sample inlet portion 24 of the carbon rod 20 and then silicon oxide and silicon are supplied. This sequential process may enable formation of the carbon coating film on a surface of the composite.

The silicon oxide and silicon particles may be sequentially supplied, or the silicon oxide and the silicon particles may be supplied at the same time in a mixed form.

The carbonaceous material may be carbon black or carbon nanotubes (CNT).

Figure 2B:
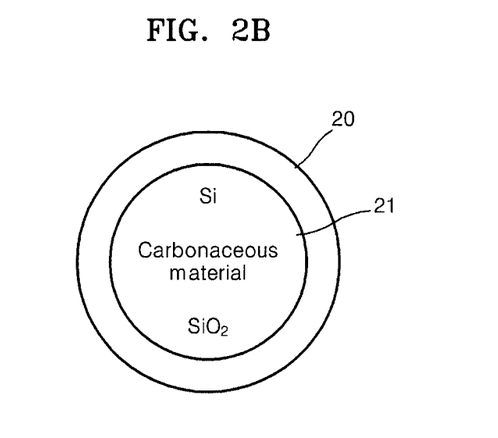
FIG. 2B is a top view of a carbon rod according to an embodiment.

FIG. 2B is a top view of the carbon rod 20 of FIG. 2A that is used for arc discharging. Referring to FIG. 2B, the diameter (a) of the sample inlet portion 21 may be from about 20 to about 30 mm, for example, about 22 mm, and the diameter (b) of the carbon rod 20 may be from about 15 to about 35 mm, for example, about 25 mm.

A length of the carbon rod 20 may be from about 100 to about 500 mm, for example, about 300 mm, and a height of the sample inlet portion 24 (see a of FIG. 2A) may be from about 150 to about 300 mm, for example, about 200 mm.

If the length and diameter of the carbon rod 20 and the diameter and height of the sample inlet portion 24 are within the ranges described above, a negative active material using the carbon rod 20 and the sample inlet portion 21 may have excellent discharge capacity and conductivity characteristics.

The carbon rod 20 may be, for example, a graphite rod with high conductivity. If a graphite rod is used, a negative active material according to an embodiment may be obtained without the filling of the carbonaceous material in the sample inlet portion 21 of the carbon rod 20.

Figure 3:
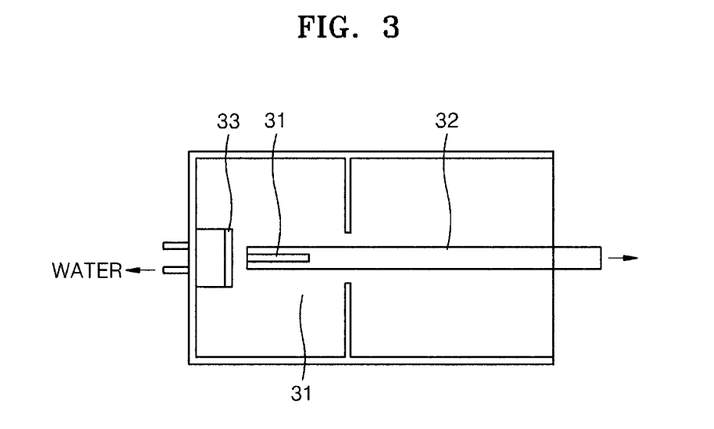
FIG. 3 is a schematic view of an arc discharge device according to an embodiment.

FIG. 3 is a schematic view of an arc discharge device according to an embodiment. Referring to FIG. 3, a negative electrode 32 for arc discharging includes a carbon rod 31 and the negative electrode 32 is installed in the arc discharge device in such a manner that the carbon rod 31 is disposed corresponding to a positive electrode 33 for arc discharging.

The positive electrode 33 for arc discharging may include Mo, Cu, Ta, or the like.

While the negative electrode 32 for arc discharging is maintained spaced apart from the positive electrode 33 for arc discharging, arc discharging is performed therebetween to prepare a negative active material that includes: a composite in which silicon particles are dispersed in a matrix including silicon oxide, silicon carbide, and carbon; and a carbon coating film formed on the surface of the composite.

During the arc discharge, a current of about 200 to about 400 A, for example, 300 A is supplied and a direct voltage of about 20 to about 50 V, for example, about 40 V may be applied. If the arc discharge is performed under the current and voltage conditions described above, metallic particles may be emitted from the positive electrode 33 due to very high-temperature arc plasma and may evaporate and be deposited immediately on a collector (not shown) disposed in an upper portion of the chamber. In this case, carbon particles are also emitted from the carbon rod 31 and thus nano-sized carbon particles are also deposited. The metal, carbon particles, and silicon carbide which are accumulated on a surface of the positive electrode 33 may be captured by the collector (not shown) and used as a negative active material.

According to the method described above, the process for forming the composite and the process for forming the carbon coating film on the composite may be performed at the same time. Thus, the manufacturing process may be simplified.

Also, the negative active material may further include other materials such as lithium metal, a metal that is alloyable with lithium, transition metal oxide, non-transition metal oxide, and a carbonaceous material.

For example, the metal that is alloyable with lithium may be Si, Sn, Al, Ge, Pb, Bi, Sb, a Si—Y alloy (where Y is alkali metal, alkali earth metal, a Group 13 element, a Group 14 element, transition metal, a rare-earth element, or a combination thereof and is not Si), a Sn—Y alloy (where Y is alkali metal, alkali earth metal, a Group 13 element, a Group 14 element, transition metal, a rare-earth element, or a combination thereof and is not Sn), or the like. The element Y in the Si—Y alloy and the Sn—Y alloy may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may be lithium titanium oxide, vanadium oxide, lithium vanadium oxide, or the like.

For example, the non-transition metal oxide may be $SnO_2$, $SiO_x(0<x<2)$, or the like.

The carbonaceous material may be crystalline carbon, amorphous carbon, or a mixture thereof. The crystalline carbon may be amorphous, plate-type, flake, spherical, or fiber-type natural or artificial graphite, and the amorphous carbon may be a soft carbon (low-temperature calcination carbon), hard carbon, a mesophase pitch carbide, calcined cork, or the like.

An example of a method of preparing a negative electrode will now be described in detail.

The negative active material described above, a conducting agent, a binder, and a solvent may be mixed to prepare a negative active material composition, and the prepared negative active material composition may be directly coated on a copper current collector to manufacture a negative electrode plate. Alternatively, the prepared negative active material composition may be cast onto a separate support and a negative active material film separated from the separate support may be laminated on a copper current collector to form a negative electrode plate.

The conductive agent, the binder, and the solvent included in the negative active material composition may be the same as used in a positive electrode. In some cases, a plasticizer may be further added to the negative active material composition to form pores in the respective electrode plates.

Amounts of the negative active material, the conducting agent, the binder, and the solvent may be at the same levels as conventionally used in a lithium battery. According to the purpose and structure of a lithium battery, one or more of the conducting agent, the binder, and the solvent may not be used.

Also, for use in other electrochemical cells, such as a super capacitor, in addition to a lithium battery, the negative electrode may be appropriately modified in terms of a manufacturing method, a composition of the negative electrode, the structure of the negative electrode, or the like.

For example, an electrode for a capacitor may be manufactured as follows: a metal structure is disposed on a conductive substrate and then a negative active material composition is coated on the metal structure, and alternatively, the negative active material composition may be directly coated on a conductive substrate.

An example of a method of preparing a positive electrode including a positive active material will now be described in detail.

A positive active material, a conductive agent, a binder and a solvent are mixed to prepare a positive active material composition. The positive active material composition is directly coated on a current collector, followed by drying, thereby forming a positive electrode on which a positive active material layer is formed. Alternatively, the positive active material composition may be cast onto a separate support and a film separated from the separate support may be laminated on an aluminum current collector to manufacture a positive electrode including a positive active material layer.

Also, the positive active material may further include other materials such as a composite oxide of lithium, and a metal such as cobalt, manganese, nickel, and a combination thereof. A detailed example of the positive active material may be a compound represented by any one of various formulae including $Li_aA_{1-b}B_bD_2$ where $0.90 \leq a \leq 1.8$, and $0 \leq b \leq 0.5$; $Li_aE_{1-b}B_bO_{2-c}D_c$ where $0.90 \leq a \leq 1.8$, $0 \leq b \leq 0.5$, and $0 \leq c \leq 0.05$; $LiE_{2-b}B_bO_{4-c}D_c$ where $0 \leq b \leq 0.5$, and $0 \leq c \leq 0.05$; $Li_aNi_{1-b-c}Co_bB_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Co_bB_cO_{2-\alpha}F_\alpha$ where $0.90 \leq a \leq 1.8$, $0 \leq b \leq 0.5$, $0 \leq c \leq 0.05$, and $0 < \alpha < 2$; $Li_aNi_{1-b-c}Co_bB_cO_{2-\alpha}F_2$ where $0.90 \leq a \leq 1.8$, $0 \leq b \leq 0.5$, $0 \leq c \leq 0.05$, and $0 < \alpha < 2$; $Li_aNi_{1-b-c}Mn_bB_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Mn_bB_cO_{2-\alpha}F_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB_cO_{2-\alpha}F_2$ where $0.90 \leq a \leq 1.8$, $0 \leq b \leq 0.5$, $0 \leq c \leq 0.05$, and $0 < \alpha < 2$; $Li_aNi_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ where $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.8$, and $0.001 \leq b \leq 0.1$; $Li_aCoG_bO_2$ where $0.90 \leq a \leq 1.8$, and $0.001 \leq b \leq 0.1$; $Li_aMnG_bO_2$ where $0.90 \leq a \leq 1.8$, and $0.001 \leq b \leq 0.1$; $Li_aMn_2G_bO_4$ where $0.90 \leq a \leq 1.8$, and $0.001 \leq b \leq 0.1$; $QO_2$; $QS_2$; $LiQS_2$; $V_2O_5$; $LiV_2O_5$; $LiIO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$.

In these formulae, A is Ni, Co, Mn, or a combination thereof; B is Al, Ni, Co, Mn, Cr, Fe, Mg, Sr, V, a rare-earth element or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, $LiCoO_2$, $LiMn_xO_{2x}$ (x=1 or 2), $LiNi_{1-x}Mn_xO_{2x}$ (0<x<1), $Ni_{1-x-y}Co_xMn_yO_2$ (0=x=0.5, 0=y=0.5), $LiFePO_4$, or the like may be used.

A coating layer may be further formed on these compounds, or a mixture of these compounds and a compound having a coating layer may also be used. The coating layer may be an oxide of a coating element, a hydroxide of a coating element, an oxyhydroxide of a coating element, an oxycarbonate of a coating element, or a hydroxycarbonate of a coating element. A compound that forms the coating layer may be amorphous or crystalline. The coating element contained in the coating layer may be Mg, Al, Co, K, Na, Ca, Si, Ti, V, Sn, Ge, Ga, B, As, Zr, or a mixture thereof. The coating layer formation process may be any one of various coating methods (for example, spray coating or precipitating) that do not adversely affect properties of the positive active material when these elements are used with respect to the compounds. The coating layer formation process may be obvious to one of ordinary skill in the art and thus will not be described herein in detail.

Examples of the conducting agent may be a carbonaceous material, such as carbon black, graphite particles, natural graphite, artificial graphite, acetylene black, ketjen black, carbon fiber, or carbon nanotube; a metal powder or a metal fiber or metal tube of copper, nickel, aluminum, silver, or the like; and a conductive polymer such as a polyphenylene derivative. However, the conducting agent is not limited thereto, and may be any one of various materials that are used as a conducting agent in the art.

Examples of the binder are a vinylidene fluoride/hexafluoropropylene copolymer, polyvinylidenefluoride, polyacrylonitrile, poly(methyl methacrylate), poly(tetrafluoro ethylene) (PTFE), a mixture of the forgoing polymers, and a styrene butadiene rubber-based polymer. Examples of the solvent are N-methylpyrrolidone (NMP), acetone, and water. The binder and the solvent are not limited to these materials and may be any of various materials that are used in the art.

Amounts of the positive active material, the conducting agent, the binder, and the solvent may be at the same levels as conventionally used in a lithium battery.

A lithium battery according to an embodiment includes the negative electrode described above. An example of a method of manufacturing the lithium battery will now be described in detail.

The positive electrode and/or the negative electrode are manufactured as described above.

Then, a separator that is to be inserted between the positive electrode and the negative electrode is prepared. The separator may be any separator that is conventionally used in a lithium battery. For example, the separator may be a material that has a low resistance to migration of ions of an electrolyte and an excellent electrolyte-retaining capability. For example, the separator may include a material selected from the group consisting of glass fiber, polyester, Teflon, polyethylene, polypropylene, polytetrafluoroethylene (PTFE), and a combination thereof, each of which may be nonwoven or woven. For example, a separator for use in a lithium ion battery may be a foldable separator comprising polyethylene or polypropylene, and a separator for use in a lithium ion polymer battery may be a separator having an excellent organic electrolyte retaining capability. An example of a method of manufacturing the separator will now be described in detail.

A separator composition may be prepared by mixing a polymer resin, a filler, and a solvent. The separator composition may be directly coated and dried on an electrode, thereby forming a separator. Alternatively, the separator composition may be cast and dried on a support as a film and then the separator film separated from the support may be laminated on an electrode, thereby forming a separator.

A polymer resin that is used to produce the separator may be any material that is used in a binder of an electrode plate. For example, the polymer resin may be a vinylidenefluoride/hexafluoropropylene copolymer, polyvinylidenefluoride (PVDF), polyacrylonitrile, polymethylmethacrylate, or a combination thereof.

Next, an electrolyte may be prepared.

For example, the electrolyte may be an organic electrolyte. Also, the electrolyte may be solid. For example, the solid electrolyte may be boron oxide, lithium oxynitride, or the like, but is not limited thereto. For example, the solid electrolyte may be any one of various solid electrolytes that are used in the art. The solid electrolyte may be formed on the negative electrode by, for example, sputtering.

For example, an organic electrolytic solution may be prepared. The organic electrolytic solution may be prepared by dissolving a lithium salt in an organic solvent.

The organic solvent may be any one of various organic solvents that are used in the art. For example, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofurane, 2-methyltetrahydrofurane, γ-butyrolactone, 1,3-dioxolane, 4-methyl-1,3-dioxolane, N,N-dimethylformamide, N,N-dimethylacetamide, N,N-dimethylsulfoxide, 1,4-dioxane, 1,2-dimethoxyethane, sulforane, dichloroethane, chlorobenzene, nitrobenzene, diethyleneglycol, dimethylether, or a mixture thereof.

The lithium salt may be any one of various lithium salts that are used in the art. For example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or a mixture thereof may be used.

The lithium battery according to an embodiment may have an intensity ratio of a SiC peak with respect to a Si peak of about 0.5 to about 0.7, for example, 0.6 in an X-ray diffraction spectrum of a negative active material after charging and discharging. The intensity ratio range indicates that silicon particles are broken down after charging and discharging.

Figure 4:
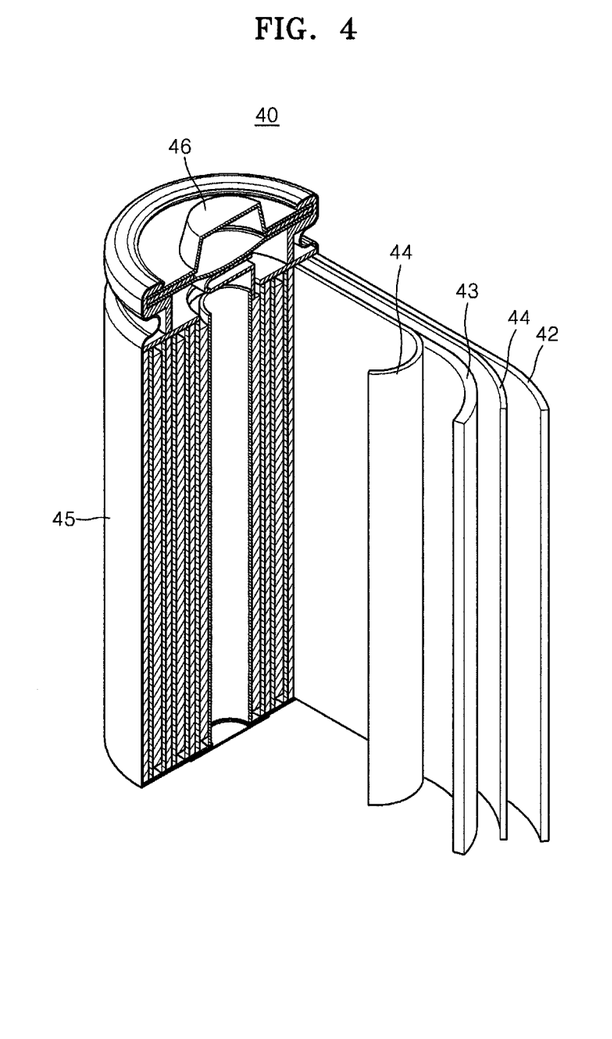
FIG. 4 is a schematic view of a lithium battery according to an embodiment.

Referring to FIG. 4, a lithium battery 40 includes a positive electrode 43, a negative electrode 42, and a separator 44. The positive electrode 43, the negative electrode 42, and the separator 44 are wound or folded to be housed in a battery case 45. Subsequently, an electrolyte is loaded into the battery case 45 and then sealed with a cap assembly 46, thereby completing manufacture of the lithium battery 40. The battery case 45 may be cylindrical, rectangular, thin film-shaped, or the like. For example, the lithium battery 40 may be a large thin film-type battery. Alternatively, the lithium battery 40 may be a lithium ion battery.

The separator is disposed between the positive electrode plate and the negative electrode plate to form a battery assembly. A plurality of the battery assemblies are stacked in a bi-cell structure, and then impregnated with an electrolyte, and the obtained structure is housed in a pouch, followed by sealing, thereby completing manufacture of a lithium ion polymer battery.

Also, a plurality of the battery assemblies are stacked on each other to form a battery pack, and the battery pack may be used in various devices that require high capacity and high power output. For example, the battery pack may be used in a notebook computer, a smartphone, an electric vehicle, or the like.

Also, the lithium battery may be used in an electric vehicle (EV) due to its storage stability at high temperature, excellent lifetime characteristics, and high-rate characteristics. For example, the lithium battery may be used in hybrid vehicles, such as a plug-in hybrid electric vehicle (PHEV).

The lithium battery may provide a discharge capacity of 800 mAh/g or more per unit weight of a negative active material included therein. Also, the lithium battery may provide a discharge capacity of 1000 mAh/cc or more per unit volume of a negative active material included therein.

The electrolytic solution may include a solvent and as the solvent, at least one solvent selected from the group consisting of acetonitrile, dimethyl ketone, and propylene carbonate may be used. The electrolytic solution may include an alkali metal salt that has a solubility of 0.01 mol/L or more with respect to the solvent and that is electrically inactive in a working voltage range of the capacitor. Examples of the alkali metal salt are lithium perchlorate, lithium tetrafluoroborate, lithium hexafluorophosphate, etc. The electrolytic solution may further include additives for improving properties of the capacitor. For example, a stabilizer or a thickener may be used.

One or more embodiments will now be described in further detail with reference to the following examples. These examples are for illustrative purpose only and are not intended to limit the scope of the one or more embodiments.

EXAMPLE 1

Preparation of Negative Active Material

A sample inlet portion having a diameter of about 22 mm and a height of about 200 mm was formed in a graphite rod having a diameter of about 25 mm and a length of about 300 mm, and the sample inlet portion was sequentially filled with 30 g of carbon black, 60 g of $SiO_2$, and 100 g of Si to prepare a negative electrode for arc discharging.

Separately, a molybdenum (Mo) electrode was used as a positive electrode for arc discharging.

The negative electrode is disposed spaced from the positive electrode by an interval of about 300 mm in an arc discharge device, and then pumping was performed until the chamber pressure was increased to about $2\times10^{-1}$ torr, followed by filling with argon gas. Then, a current of about 300 A and a direct voltage of about 40 V are provided thereto to perform arc discharging, thereby completing the preparation of a negative active material.

EXAMPLE 2

Preparation of Negative Active Material

A negative active material was prepared in the same manner as in Example 1, except that 20 g of carbon black was used in preparing the negative electrode for arc discharging.

EXAMPLE 3

Preparation of Negative Active Material

A negative active material was prepared in the same manner as in Example 1, except that 10 g of carbon black was used in preparing the negative electrode for arc discharging.

EXAMPLE 4

Preparation of Negative Active Material

A negative active material was prepared in the same manner as in Example 1, except that carbon black was not used.

MANUFACTURING EXAMPLE 1

Preparation of Negative Electrode and Lithium Secondary Battery 70 mg of the negative active material prepared according to Example 1, 15 mg of a carbon conductive agent (Super-P, Timcal Inc.), and 15 mg of a binder (polyamide/imide, PAD) were mixed with 15 mL of N-methylpyrrolidone (NMP) in an agate mortar to prepare a slurry. The slurry was coated on a copper current collector by using a doctor blade to a thickness of about 50 Kμm, followed by drying at room temperature for 2 hours, and drying at a temperature of 200° C. for 2 hours under vacuum conditions, thereby completing the preparation of a negative electrode plate.

The negative electrode plate, a counter electrode comprising lithium metal, a polypropylene separator (Cellgard 3510), and an electrolyte in which 1.3M $LiPF_6$ was dissolved in a mixed solution including ethylene carbonate (EC) and diethyl carbonate (DEC) (at a weight ratio of 3:7) were used in manufacturing a CR-2016 standard coin-cell.

MANUFACTURING EXAMPLES 2 TO 4

CR-2016 standard coin-cells were manufactured in the same manner as in Manufacturing Example 1, except that the negative active materials prepared according to Examples 2 to 4 were used instead of the negative active material prepared according to Example 1.

EVALUATION EXAMPLE 1

X-Ray Diffraction Analysis

Figure 5:
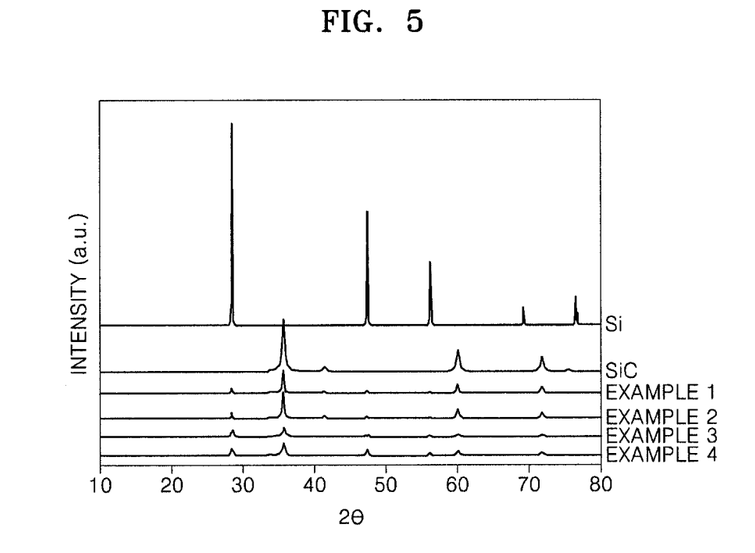
FIG. 5 shows X-ray diffraction analysis spectra of negative active materials prepared according to Examples 1 to 4.

An X-ray diffraction analysis was performed on the negative active material prepared according to Examples 1 to 4, and results thereof are shown in FIG. 5. In FIG. 5, a peak of a Si(111) plane and a peak of a SiC(111) plane are also illustrated as a reference with respect to the XRD peaks of the negative active materials prepared according to Examples 1 to 4.

During the X-ray diffraction test, a CuK-alpha characteristic X-ray having a wavelength of 1.541 Å was used, and an XPERT-PRO (Philips Co., Ltd) was used as an X-ray diffraction analyzer.

In the X-ray diffraction spectrum of FIG. 5, a peak corresponding to the Si(111) plane is present at a Bragg 2θ angle of about 28°, and a peak corresponding to the SiC(111) plane is present at a Bragg 2θ angle of about 36°. Also, the peak at a Bragg 2θ angle of about 47° indicates that Si is present; the peak at a Bragg 2θ angle of about 56° also indicates that Si is present, and the peak at a Bragg 2θ angle of about 60° indicates that SiC is present.

An intensity ratio of the peak of the SiC(111) plane with respect to the peak of the Si(111) plane and a FWHM of the SiC(111) plane peak of each of the negative active materials prepared according to Examples 1 to 4 are shown in Table 1 below.

TABLE 1

|  | Intensity ratio of the peak of the SiC(111) plane with respect to the peak of the Si(111) plane | Full width at half maximum (FWHM) of the SiC plane peak (°) |
| --- | --- | --- |
| Example 1 | 5.5 | 0.46 |
| Example 2 | 5.0 | 0.59 |
| Example 3 | 1.4 | 0.93 |
| Example 4 | 1.8 | 0.68 |

EVALUATION EXAMPLE 2

X-Ray Fluorescence (XRF) Analysis

Figure 6A:
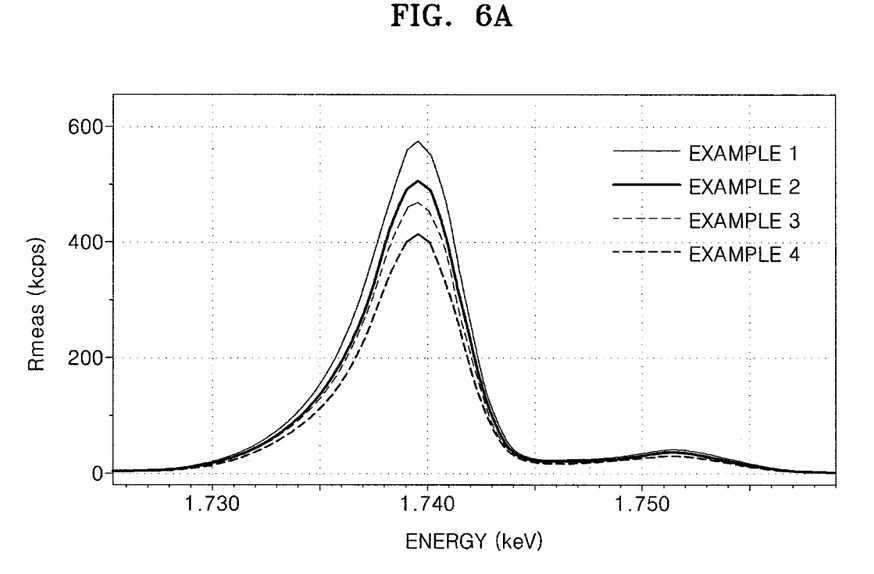
FIGS. 6A and 6B show X-ray fluorescence analysis spectra of negative active materials prepared according to Examples 1 to 4.
Figure 6B:
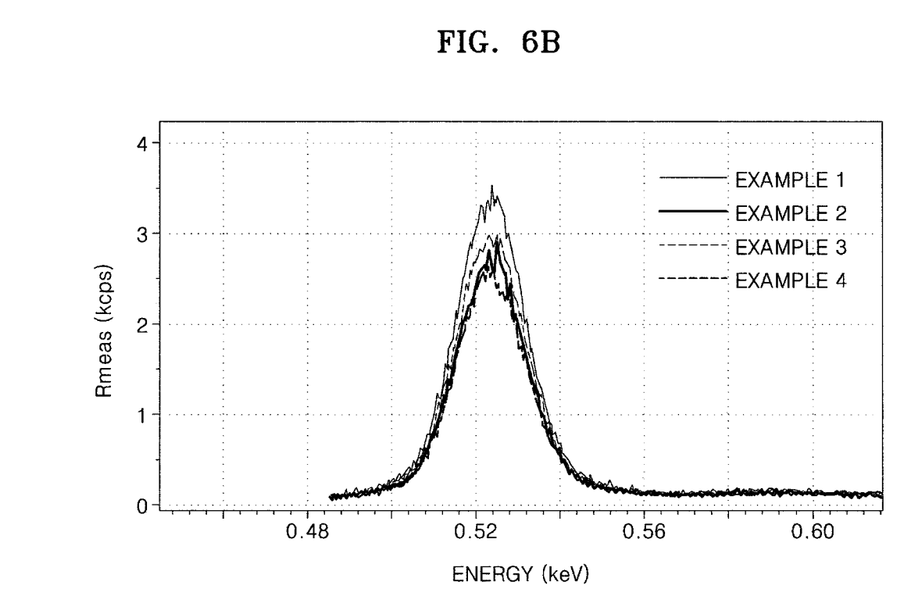

An X-ray fluorescence analysis test was performed on each of the negative active material prepared according to Examples 1 to 4, and results thereof are shown in FIGS. 6A and 6B. FIG. 6A is a graph with respect to silicon and FIG. 6B is a graph with respect to oxygen.

A WD-XRF (Philips PW2400) was used as a device for the X-ray fluorescence analysis.

Amounts of silicon, oxygen, and carbon were capable of being measured in reference to an intensity ratio of peaks corresponding to silicon and oxygen of the graphs of FIGS. 6A and 6B and a calibration curve with respect to a standard sample. The amounts of silicon, oxygen, and carbon of each of the negative active materials prepared according to Examples 1 to 4 are shown in Table 2 below.

TABLE 2

|  | Silicon (Si) (wt %) | Oxygen (O) (wt %) | Carbon (C) (wt %) |
| --- | --- | --- | --- |
| Example 1 | 60 to 65 | 20 to 23 | 15-20 |
| Example 2 | 55 to 60 | 17 to 20 | 20-28 |
| Example 3 | 50 to 55 | 14 to 17 | 28-36 |
| Example 4 | 45 to 50 | 10 to 14 | 36-45 |

EVALUATION EXAMPLE 3

Electron Scanning Microscope (SEM) Analysis

Figure 7A:
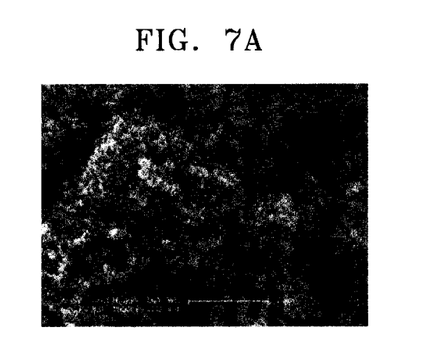
FIGS. 7A and 7B show electron scanning microscopy images of negative active materials prepared according to Examples 1 and 4.
Figure 7B:
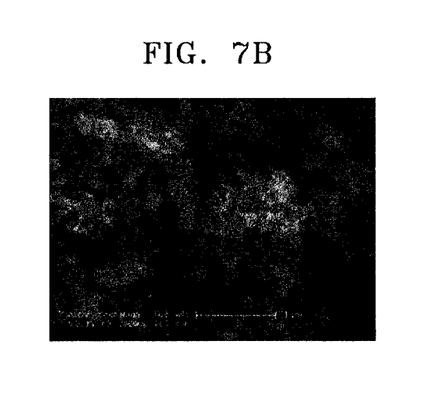

SEM images of the negative active materials prepared according to Examples 1 to 4 are shown in FIGS. 7A and 7B. FIGS. 7A and 7B show images at about 30,000 magnification.

EVALUATION EXAMPLE 4

Electron Dispersion Spectroscope (EDS) Analysis

Figure 8:
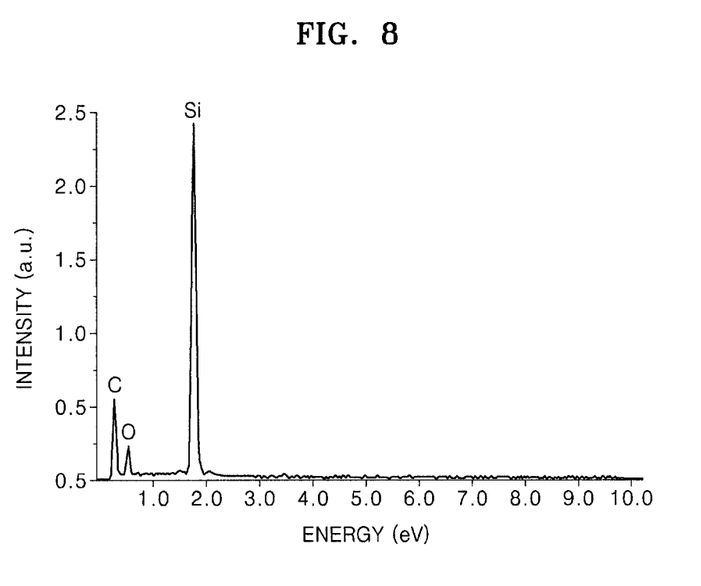
FIG. 8 is an electron dispersion spectroscope (EDS) analysis graph of the negative active material prepared according to Example 4.

An EDS analysis was performed on the negative active material prepared according to Example 1, and results thereof are shown in FIG. 8.

Referring to FIG. 8, it was confirmed that Si, O, and C are present and amounts thereof were capable of being measured. The element C was confirmed as a carbon that was present in a composite and as a carbon that was included in a carbon coating film formed on the surface of the composite.

EVALUATION EXAMPLE 5

Charge and Discharge Test

The lithium batteries manufactured according to Manufacturing Examples 1-4 were charged with a current of 100 mA per 1 g of the respective negative active materials until a voltage reached 0.001 V (vs. Li), and then discharged with the same amplitude of current until the voltage reached 3 V (vs. Li). Subsequently, the cycle of the charging and discharging was repeatedly performed 50 times within the same current and voltage ranges.

Figure 9:
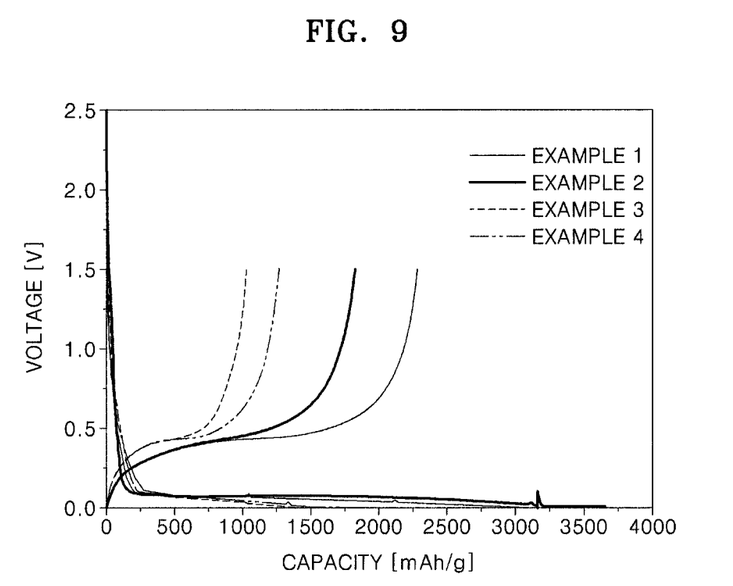
FIG. 9 shows charge and discharge test results of lithium batteries manufactured according to Manufacturing Examples 1 to 4.

Charge and discharge results of the lithium batteries manufactured according to Manufacturing Examples 1-4 in the first cycle are shown in FIG. 9.

The discharge capacity, the initial charge and discharge efficiency, and the capacity retention rate of the lithium batteries manufactured according to Manufacturing Examples 1-4 in the first cycle are shown in Table 3. The capacity retention rate is defined as Equation 2 below, and the initial charge and discharge efficiency is defined as Equation 3 below.

Capacity retention rate [%]=[50th cycle discharge capacity/2nd cycle discharge capacity]×100   Equation 2

Initial charge and discharge efficiency [%]=[$1^{st}$ cycle discharge capacity/$1^{st}$ cycle charge capacity]×100   Equation 3

TABLE 3

|  | $1^{st}$ cycle discharge capacity [mAh/g] | Initial charge and discharge efficiency [%] | Capacity retention rate [%] |
|---|---|---|---|
| Manufacturing Example 1 | 2270 | 50 | 60 |
| Manufacturing Example 2 | 1830 | 67 | 50 |
| Manufacturing Example 3 | 1260 | 60 | 45 |
| Manufacturing Example 4 | 1020 | 52 | 40 |

As shown in FIG. 9 and Table 3, it was confirmed that the lithium batteries manufactured according to Manufacturing Examples 1-4 have excellent discharge capacity, initial efficiency, and capacity retention rate characteristics.

EVALUATION EXAMPLE 6

X-Ray Diffraction Test after Charging and Discharging

The lithium battery manufactured according to Manufacturing Example 1 was charged with a current of 100 mA per 1 g of the negative active material until a voltage reached 0.001 V (vs. Li), and then discharged with the same amplitude of current until the voltage reached 3 V (vs. Li). Subsequently, the cycle of the charging and discharging was repeatedly performed 50 times within the same current and voltage ranges.

The coin cells were disassembled to collect only the negative active materials and XRD analysis was performed on the negative active materials. Results thereof are shown in FIG. 10.

Figure 10:
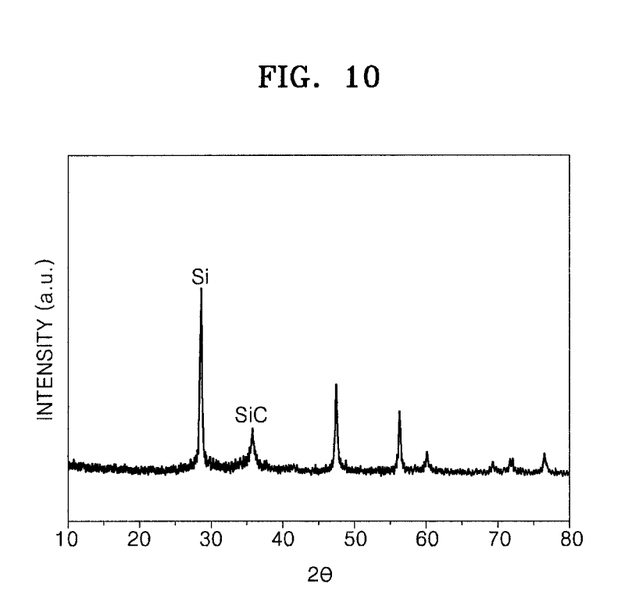
FIG. 10 shows an X-ray diffraction analysis spectrum of a negative active material included in a lithium battery manufactured according to Manufacturing Example 1 after the lithium battery has been charged and discharged 50 times.

Referring to FIG. 10, a SiC peak is still present after charging and discharging, and an intensity ratio of the SiC peak with respect to the Si peak is about 0.6.

It should be understood that the example embodiments described herein should be considered in a descriptive sense only and not for purposes of limitation. Descriptions of features or aspects within each embodiment should typically be considered as available for other similar features or aspects in other embodiments.

What is claimed is:

1. A negative active material comprising:
   a composite of SiOxCy, wherein x is from about 0.1 to about 1.2, y is from about 0.01 to 0.2 comprising,
      a matrix comprising silicon oxide, silicon carbide, and carbon; and
      silicon particles dispersed in the matrix; and
   a carbon coating film formed on a surface of the composite,
   wherein the intensity ratio of a SiC peak to a Si (111) peak in an X-ray diffraction spectrum is about 1 or more,
   wherein the amount of silicon is from about 45 wt % to about 65 wt %, the amount of oxygen is from about 10 to about 23 wt %, and the amount of carbon is from about 12 wt % to about 45 wt %, based on measurements derived from X-ray fluorescence analysis of the negative active material.

2. The negative active material of claim 1, wherein in the X-ray diffraction spectrum of the negative active material, a full width at half maximum of the SiC peak is from about 0.1° to about 1°.

3. The negative active material of claim 1, wherein in the X-ray diffraction spectrum of the negative active material, the SiC peak is present at a Bragg 2θ angle of from about 34° to about 37°.

4. The negative active material of claim 1, wherein in the X-ray diffraction spectrum of the negative active material, the intensity ratio of the SiC peak to the Si peak is from about 1 to about 10.

5. The negative active material of claim 1, wherein the amount of silicon oxide in the negative active material is from about 10 to about 30 parts by weight based on 100 parts by weight of the silicon particles.

6. The negative active material of claim 1, wherein an amount of silicon carbide in the negative active material is from about 50 to about 90 parts by weight based on 100 parts by weight of the silicon particles.

7. The negative active material of claim 1, wherein the amount of carbon in the carbon coating film of the negative active material is from about 0.1 to about 20 parts by weight based on 100 parts by weight of the composite.

8. The negative active material of claim 1, wherein an average particle size of the silicon particles is from about 1 to about 300 nm.

9. A method of preparing a negative active material comprising a composite of SiOxCy, wherein x is from about 0.1 to about 1.2, y is from about 0.01 to 0.2 comprising a matrix comprising silicon oxide, silicon carbide, and carbon and silicon particles dispersed in the matrix, and a carbon coating film formed on a surface of the composite, wherein an intensity ratio of a SiC peak to a Si (111) peak in an X-ray diffraction spectrum is 1 or more, wherein the amount of silicon is from about 45 wt % to about 65 wt %, the amount of oxygen is from about 10 to about 23 wt %, and the amount of carbon is from about 12 wt % to about 45 wt %, based on measurements derived from X-ray fluorescence analysis of the negative active material the method comprising:
   supplying silicon particles and silicon oxide to a carbon rod to prepare a negative electrode for arc discharging; and
   arc discharging the negative electrode and a positive electrode for arc discharging.

10. The method of claim 9, wherein a carbonaceous material is further supplied before silicon particles and silicon oxide are supplied to the carbon rod.

11. The method of claim 10, wherein the amount of the carbonaceous material is from about 0.5 to about 50 parts by weight based on 100 parts by weight of silicon particles.

12. The method of claim 9, wherein the arc discharging is performed by applying a direct voltage of about 20 to about 50 V to at least one of the carbon rod, negative electrode and positive electrode.

13. The method of claim 9, wherein an amount of the silicon carbide is from about 50 to about 90 parts by weight based on 100 parts by weight of the silicon particles.

14. A negative electrode comprising the negative active material of claim 1.

15. The negative electrode of claim 14, wherein in the X-ray diffraction spectrum of the negative active material, a full width at half maximum of the SiC peak is from about 0.1° to about 1°.

16. The negative electrode of claim 14, wherein in the X-ray diffraction spectrum of the negative active material, the SiC peak is present at a Bragg 2θ angle of from about 34° to about 37°.

17. The negative electrode of claim 14, wherein in the X-ray diffraction spectrum of the negative active material, the intensity ratio of the SiC peak to the Si peak is from about 1 to about 10.

18. A lithium battery comprising a negative electrode comprising the negative active material of claim 1.

19. The lithium battery of claim 18, wherein in the X-ray diffraction spectrum of the negative active material after the lithium battery is charged and discharged, the intensity ratio of the SiC peak to the Si peak is from about 0.5 to about 0.7.

* * * * *